United States Patent [19]

Hashimoto

[11] Patent Number: 4,708,557

[45] Date of Patent: Nov. 24, 1987

[54] DRILL SCREW

[75] Inventor: Kenzaburo Hashimoto, Hirakata, Japan

[73] Assignee: Fuji Tec Co., Ltd., Osaka, Japan

[21] Appl. No.: 860,798

[22] Filed: May 8, 1986

[30] Foreign Application Priority Data

Feb. 12, 1986 [JP] Japan .................................. 61-28156

[51] Int. Cl.$^4$ ............................................. F16B 25/00
[52] U.S. Cl. ..................................... 411/387; 408/230
[58] Field of Search ................ 411/386, 387, 417–421; 408/230, 715, 227, 228, 229, 211

[56] References Cited

U.S. PATENT DOCUMENTS

| 3,665,801 | 5/1972 | Gutshall | 408/230 X |
| 4,295,768 | 10/1981 | Skierski | 411/387 |
| 4,407,620 | 10/1983 | Shinjo | 411/387 |
| 4,568,229 | 2/1986 | Hulsey | 411/387 |
| 4,599,024 | 7/1986 | Sano et al. | 408/228 X |

FOREIGN PATENT DOCUMENTS 3604390 8/1986 Fed. Rep. of Germany ...... 411/387

1316157 5/1973 United Kingdom ................ 411/387

Primary Examiner—Lloyd A. Gall
Attorney, Agent, or Firm—Sixbey, Friedman & Leedom

[57] ABSTRACT

There is disclosed herein a drill screw which comprises a threaded shank, a drilling portion formed at the forward end of the shank and a head formed at the rearward end of the shank and having a wrench head. The drilling portion includes a body extending axially from the shank, a drilling tip extending forwardly from the body and having a pair of diametrically opposite axially extending flutes. In this arragement, horizontal end cutting edges are provided at the forward end of the drilling tip whereas no web is provided at the forward end thereof. Inclined cutting edges are provided at opposite side edges of the drilling tip and side cutting edges are provided at opposite side edges of the body. The end cutting edges, the inclined cutting edges and the side cutting edges all lie in a diametral axial plane of the drilling portion while cooperating together to form rake faces inclined to cutting surfaces which form the bottom of the flutes.

7 Claims, 8 Drawing Figures

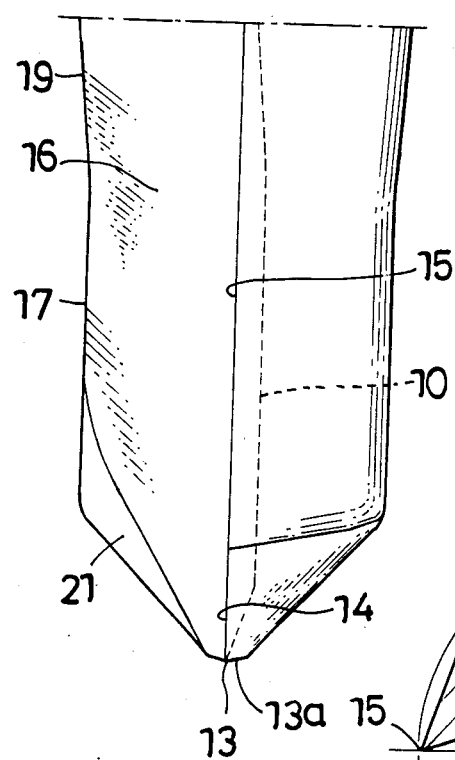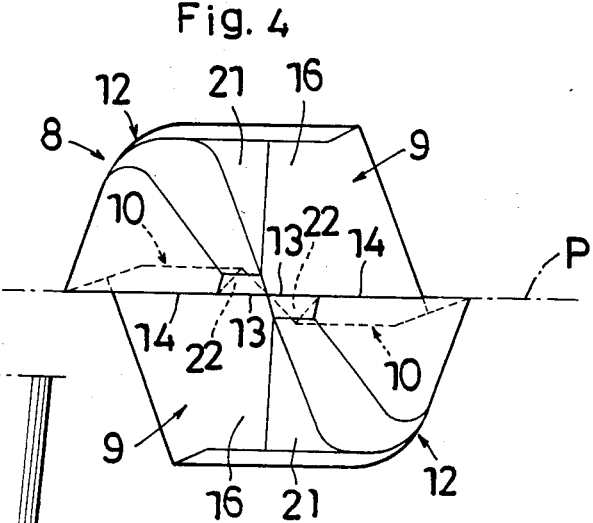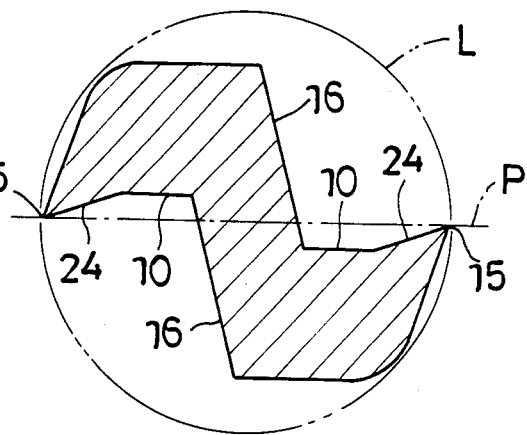

DRILL SCREW

BACKGROUND OF THE INVENTION

1. Field of the Invention

The present invention relates to a threaded fastener or a drill screw in which a threaded shank is formed at its forward end with a drilling portion.

2. Description of the Related Art

A drill screw of the type mentioned initially, advantageously drills its own pilot hole and then, cut threads in the work for drilling purposes.

The drill screw may be formed by two basic processes, one is by a machining process, for example, fabricating a drilling portion of the drill screw by the use of a milling cutter, and the other is by a pinching or cold heading and rolling process. The latter process is advantageous over the former in productive and economical senses.

A conventional drill screw generally includes a drilling portion having a body extending axially from a shank and a drilling tip extending forwardly of the body. A pair of diametrically opposite axially extending flutes are formed in the drilling portion to form surfaces which terminate at cutting edges. The cutting edges include inclined cutting edges located at opposite side edges of the drilling tip, and side cutting edges joined angularly to the inclined cutting edges and located at opposite sides of the body. Like a general-purpose drill, a web (or core) is provided between the flutes and extends from the center of the body to the forward end of the drilling tip. To this end, the inclined cutting edges are oppositely offset from a diametral axial plane of the drilling tip and lie in a plane parallel thereto. The drilling tip has inclined surfaces or body clearances extending rearwardly and angularly from the tip and thus, a chisel point is defined by a ridge where the two inclined cutting edges are joined.

Like a general-purpose drill, in a conventional drill screw, such a web is formed at the forward end of the drilling tip to form therein a chisel point.

However, such arrangement makes it difficult to insert the drill screw into the work during the starting of the drilling operation. That is, such a chisel point is defined by the joining of oppositely disposed body clearances. Accordingly, the chisel point is of V-shape in section and two surfaces are oppositely and symmetrically inclined with respect to chisel edges. One of the surfaces is a "rake face" and the other is a "relief surface." When the drill screw is rotated for insertion into the work, the "rake face" is inclined relative to the surface of the work or the horizontal plane at an angle of less than 90° or at a "negative rake angle." It is for these reasons that the chisel point forcibly drills the work under pressure and friction and undersirable drilling results during the starting of the drilling operation.

This is due to the fact that conventional drill screws are designed in the same manner as general-purpose drills.

As to the general-purpose drills, a web is essential to maintain its strength as well as to always keep its cutting edges sharp by abrasion. On the other hand, a drill screw is used only once and therefore, sharpening by abrasion need not be made. Such a web may be used only to maintain the strength of the drilling portion.

In order to improve operating characteristics during the starting of the drilling operation, it is desired that end cutting edges of the drilling portion are made as sharp as possible. To this end, thinning has hitherto been effected to sharpen the forward end of the web. However, the chisel point still remains at the forward end of the web regardless of such thinning and a "negative rake angle" is formed therein. The problem thus remains unsolved.

In order to solve the foregoing problem, instead of the chisel point, it is necessary to provide a "positive rake angle", namely, angle formed between the work surface and the rake face is greater than 90°. Importantly, in case that the drilling portion is made by cold heading and rolling techniques by the use of a pair of dies, it is impossible to provide end cutting edges having a "positive rake angle" at the web while the web is still presented at the forward end of the drilling tip. Therefore, only end cutting edges are to be provided while eliminating the web. In this manner, the "positive rake angle" can be defined if the drilling portion is made by cold heading and rolling techniques. As mentioned earlier, the drill screw, unlike the general-purpose drill which is used normally for a prolonged period of time, is used only once and therefore, no problem arises if the web is not provided.

SUMMARY OF THE INVENTION

The present invention has been made in view of the foregoing, and has for its purpose to provide a drill screw which enables materially improved operating characteristics to be obtained during the starting of the drilling operation by forming end cutting edges having "positive rake angles" without having a web at the forward end of a drilling tip in a drilling portion.

According to the present invention, a drill screw comprises a threaded shank, a drilling portion formed at the forward end of the shank, and a head formed at the rearward end of the shank and having a wrench head. The drilling portion includes a body extending axially from the shank in a forward direction, a drilling tip extending forwardly from the body and having a pair of diametrically opposite axially extending flutes. In this arrangement, cutting surfaces are formed by the respective flutes and terminate at cutting edges. The cutting edges include end cutting edges at the forward end of the drilling tip, inclined cutting edges extending rearwardly and angularly from the end cutting edges and located at opposite side edges of the drilling tip, and side cutting edges extending rearwardly from the inclined cutting edges and located at opposite side edges of the body. The end cutting edges extend in a direction perpendicular to the axis of the drilling portion and are located at the forward end of the drilling tip, no web being provided at the forward end of the drilling tip. Further, the end cutting edges and the inclined cutting edges lie in a diametral axial plane of the drilling portion, and define therebetween rake faces which are angularly inclined to the cutting surfaces offset from the diametral axial plane.

Although the drill screw according to the invention has the drilling portion made by cold heading and rolling techniques, the drilling tip of the drilling portion can have positive rake angles. Thus, the initial drilling operating characteristics are materially improved.

BRIEF DESCRIPTION OF THE DRAWINGS

FIG. 3 is an enlarged side elevational view of the drilling portion of FIG. 1;

FIG. 4 is an end view of the drilling portion;

FIG. 5 is a view taken on line V—V of FIG. 2;

DESCRIPTION OF A PREFERRED EMBODIMENT

A preferred embodiment of the present invention will now be described with reference to the accompanying drawings.

Figure 1:
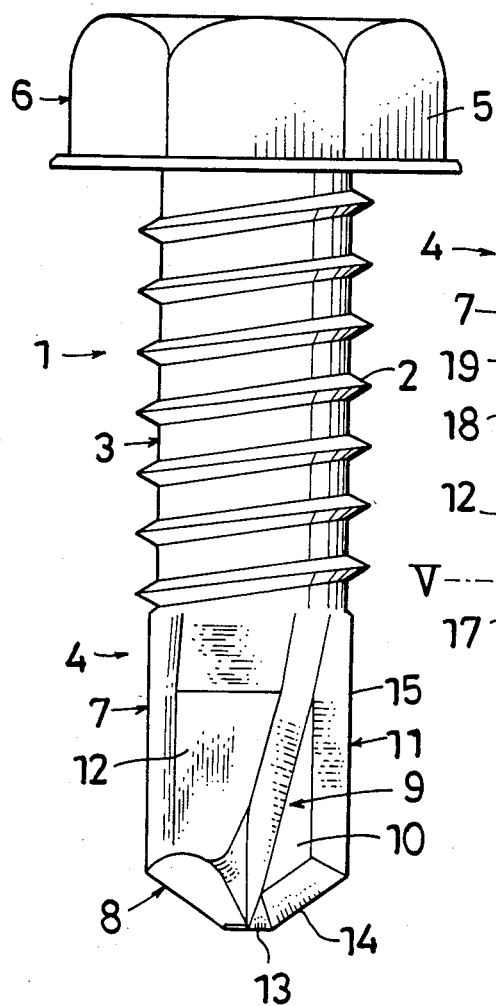
FIG. 1 is a front elevational view of a drill screw according to one embodiment of the present invention.

As shown in FIG. 1, a drill screw 1 generally includes a shank 3 carrying threads 2, a drilling portion 4 formed at the forward end of the shank 3, and a head 6 formed at the rearward end of the shank 3 and having a wrench head 5. The drilling portion 4 may be formed by cold heading techniques, wherein a shank blank is clamped by a pair of dies under pressure, to provide a generally cylindrical body 7 and a drilling tip 8 extending forwardly from the body 7. Diametrically opposite flutes 9, 9 are formed in the drilling portion 4 in its axial direction to provide cutting surfaces 10. Each cutting surface 10 is outwardly terminated at a cutting edge 11. Lands 12, 12 are provided between the flutes 9, 9. This structure is commonly known in the drilling art.

According to the invention, the cutting edges 11, 11 include end cutting edges 13, 13 disposed at the forward end of the drilling tip 8, inclined cutting edges 14, 14 diverging rearwardly from the end cutting edges 13, 13 and side cutting edges 15, 15 extending generally rearwardly from the inclined cutting edges 14, 14 along the longitudinal axis of the body 7. The end cutting edges 13, 13, the inclined cutting edges 14, 14 and the side cutting edges 15, 15, all lie in a diametral axial plane P (FIG. 4 and FIG. 5). The cutting surfaces 10, 10 are offset from and substantially parallel to the diametral axial plane P.

Figure 2:
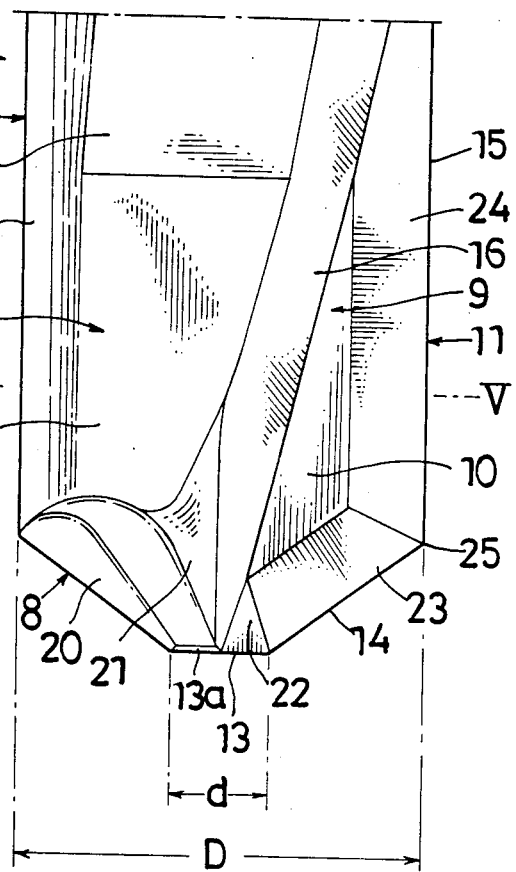
FIG. 2 is an enlarged fragmentary view showing the drilling portion of the drill screw of FIG. 1.

As shown in FIG. 2, the lands 12, 12 each have a relief surface (body clearance) 18 which lies inside a pitch line or circle L (FIG. 5) of the side cutting edge 15 and extending from the side cutting edge 15. A flat surface 17 is joined to the relief surface 18 and lies in a plane parallel to the diametral axial plane P. Joined to the flat surface 17 is a drag surface 16 which is inclined to the cutting surface 10 in a face-to-face relationship. An inclined flat surface 19 extends rearwardly from the flat surface 17, said flat surface being of gradually increasing diameter toward the rear end of the drill portion 4. The drag surface 16 extends to the forward end of the drilling tip 8. This drilling tip 8 has a secondary body clearance 20 extending rearwardly and inclinedly from the inclined cutting edge 14 to the land 12, and an intermediate surface 21 is formed between the drag surface 16 and the secondary body clearance 20 and extends from the flat surface 17 to a portion near the forward end of the drilling tip 8.

The end cutting edge 13, the inclined cutting edge 14 and the side cutting edge 15 all extend to the cutting surface 10, which is in the form of a recess and is offset from the diametral axial plane P, to provide rake faces 22, 23 and 24 between the cutting surface 10 and the cutting edges 13, 14 and 15. The faces 22, 23 and 24 are all flat and are angularly inclined relative to the cutting surface 10. The rake face 22 of the end cutting edge 13 is defined between the drag surface 16 and the face 23, and is of reversed triangular shape. It is for this reason that no web is provided at the forward end of the drilling tip 8. As shown in FIG. 4, a pair of the end cutting edges 13, 13 are joined to the end of the drilling tip, and are in colinear relation to each other, in a line extending in a direction perpendicular to the axis of the drill portion. Alternatively, the end cutting edges 13, 13 may be angularly jointed to each other to form a tip and rearwardly diverge from the tip. A secondary body clearance 13a is rearwardly inclined from the end cutting edge 13 by a slight angle and is joined to the secondary body clearance 20 (FIG. 3).

The side cutting edge 15 extends parallel to the longitudinal axis of the drilling portion 4 (FIG. 2 and FIG. 3). The inclined cutting edges 14, 14 are inclined relative to the axis of the drilling portion in the manner illustrated, and are joined to the side cutting edges 15, 15 at an intersection 25. The intersection or outer points 25 provide a maximum diameter D by which the circle L is formed. The land 12 is located within the circle L (FIG. 5). The maximum diameter D is greater than the root diameter of the threads 2 formed on the shank 3 and is less than the crest diameter thereof. Preferably, the ratio of the maximum diameter D to a maximum diameter d provided by the end cutting edges 13, 13 is 4 to 1 (FIG. 2).

(OPERATION)

Figure 6:
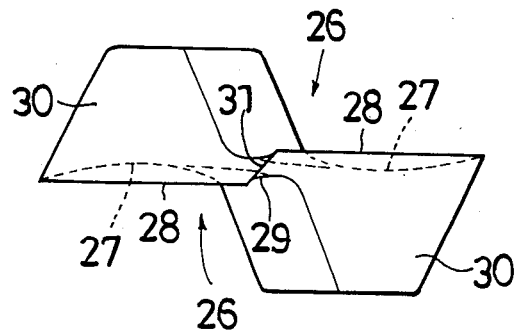
FIG. 6 is an end view of the drilling portion of a conventional drill screw.
Figure 7:
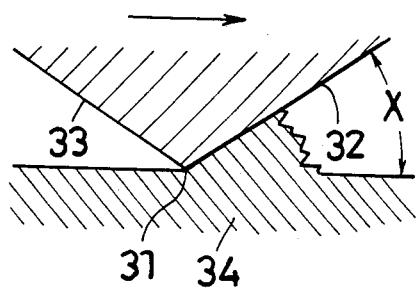
FIG. 7 is an enlarged sectional view showing a chisel point of the prior art drill screw during the starting of the drilling operation.

FIG. 6 shows a conventional drill screw including a drilling portion. The drilling portion has a pair of flutes 26, 26. Cutting surfaces 27, 27 are formed by the corresponding flutes 26, 26 and have edges 28, 28 serving as cutting edges. The cutting edges 28, 28 are offset from a diametral axial plane of the drilling tip and are diametrically opposite relative thereto. A web (or core) 29 is formed at the end of the drilling tip between the two flutes 26, 26. Two secondary body clearances 30, 30 are joined to each other on the web 29 to thereby form a chisel point 31. As shown in FIG. 7, inclined surfaces 32, 33 diverge rearwardly from a chisel edge and are V-shaped as seen in side elevation, one being a rake face 32 and the other being a relief surface 33. The rake face 32 is located between the axial plane of the drilling portion and the surface of a material 34 to be drilled and has a "negative rake angle" X (namely, $X \leq 90°$). When the drill screw is rotated upon engagement of the chisel 31 with the work for initial drilling purposes, the rake face 32, having the "negative rake angle" X, forcibly drills the surface of the work due to drag and friction. This results in undesirable initial drilling operations.

Figure 8:
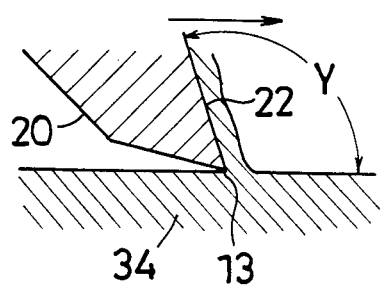
FIG. 8 is an enlarged sectional view showing end cutting edges of the present drill screw during the starting of the drilling operation.

On the other hand, in the present invention, the body clearance 22 of the end cutting edge 13 has a "positive rake angle" Y (namely, $Y \geq 90°$) as shown in FIG. 8. When the drill screw 1 is rotated upon engagement of the end cutting edges 13, 13 with the work 34 for initial drilling purposes, the rake face 22, having the "positive rake angle" Y, appropriately drills the work in such a manner as to bite thereinto. In this manner, effective initial drilling operations can be achieved. Moreover, the two end cutting edges 13, 13 are located at the front end of the drilling tip 8 and in a horizontal line, a line in a direction perpendicular to the axis of the drilling portion as mentioned above. This arrangement advantageously provides sufficient circumferential velocity to a portion of the end cutting edges disposed 13, 13 away from the center of rotation of the drill screw. Namely, a portion adjacent the intersection of the end cutting edges with the inclined cutting edges has a velocity sufficient to drill the work 34. Thus, initial drilling operating characteristics can materially be improved. In this connection, if the ratio of the maximum diameter D to the maximum diameter d is about 4 to 1 as mentioned earlier, relatively small thrust will suffice during the starting of the drilling operation.

Initial drilling is effected by the end cutting edges 13, 13 and subsequent drilling is carried out by the inclined cutting edges 14, 14 and the side cutting edges 15, 15. The rake face 23 of each of the edges 14, 14 and the rake face 24 of each of the edges 15, 15 have "positive rake angles" relative to the inner peripheral surface of a hole drilled during the starting of the drilling operation, and thus, the work 34 is properly drilled.

In the illustrated embodiment, no web is formed at the forward end of the drilling tip 8. Instead, the end cutting edges 13, 13 occupy the forward end of the drilling tip 8 and as a result, the strength of the forward end of the drilling tip 8 is less than that of a conventional drilling tip having a web. However, the drill screw is only used once to drill the work during the starting of the drilling operation. It is for this reason that the reduction in the strength of the drilling tip that occurs if such a web is not provided is not significant. As to the strength of the entire drilling portion, the drag surface 16 is inclined relative to the axis of the drilling portion and extends, together with the intermediate surface 21, to a portion adjacent the forward end of the drilling tip 8. Therefore, a web is formed therein to provide sufficient strength.

It will be understood that the present invention is not limited to the foregoing embodiment, and that various changes and modifications may be made without departing from the spirit and scope of the appended claims.

What is claimed is:

1. A drill screw comprising a threaded shank, a drilling portion formed at a forward end of said shank, and a head formed at a rearward end of said shank, said drilling portion including a body extending axially from said shank in a forward direction, a drilling tip extending forwardly from said body and having a pair of diametrically opposite axially extending flutes, cutting surfaces being formed by said flutes and terminating at cutting edges, said cutting edges including end cutting edges at the forward end of said drilling tip, inclined cutting edges extending rearwardly and angularly from said end cutting edges and located at opposite side edges of said drilling tip, and side cutting edges extending rearwardly from said inclined cutting edges and located at opposite side edges of said body, said end cutting edges being located at the forward end of said drilling tip without a web being provided between said end edges at the forward end of the drilling tip, and said end cutting edges and said inclined cutting edges lying in a diametral axial plane of said drilling portion and defining rake surfaces, said rake surfaces being angularly inclined relative to said cutting surfaces and said cutting surfaces being offset from said diametral axial plane.

2. A drill screw according to claim 1, wherein said end cutting edges lie in a horizontal line, a line extending in a direction substantially perpendicular to the axis of said drilling portion.

3. A drill screw according to claim 2, wherein the ratio of a maximum diameter defined by said inclined cutting edges to a maximum diameter defined by said end cutting edges with respect to said diametric axial plane is about 4 to 1.

4. A drill screw according to claim 2, wherein said side cutting edges lie in said diametral axial plane, form rake surfaces which cooperate with the rake surfaces defined by the end cutting edges and inclined cutting edges and are inclined relative to said cutting surfaces.

5. A drill screw according to claim 1, wherein the ratio of a maximum diameter defined by said inclined cutting edges to a maximum diameter defined by said end cutting edges with respect to said diametric axial plane is about 4 to 1.

6. A drill screw according to claim 5, wherein said side cutting edges lie in said diametral axial plane, form rake surfaces which cooperate with the rake surfaces defined by the end cutting edges and inclined cutting edges and are inclined relative to said cutting surfaces.

7. A drill screw according to claim 1, wherein said side cutting edges lie in said diametral axial plane, form rake surfaces which cooperate with the rake surfaces defined by the end cutting edges and inclined cutting edges and are inclined relative to said cutting surfaces.

* * * * *